United States Patent
Han et al.

(10) Patent No.: US 10,174,688 B2
(45) Date of Patent: Jan. 8, 2019

(54) METHOD OF CONTROLLING ENGINE SYSTEM EQUIPPED WITH SUPERCHARGER

(71) Applicant: Hyundai Motor Company, Seoul (KR)

(72) Inventors: Kyoung Chan Han, Gunpo-si (KR); Seung Eun Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 237 days.

(21) Appl. No.: 15/223,348

(22) Filed: Jul. 29, 2016

(65) Prior Publication Data

US 2017/0152800 A1     Jun. 1, 2017

(30) Foreign Application Priority Data

Nov. 30, 2015 (KR) .................. 10-2015-0168765

(51) Int. Cl.
*F02B 33/44* (2006.01)
*F02B 33/00* (2006.01)
(Continued)

(52) U.S. Cl.
CPC .......... *F02D 41/0007* (2013.01); *F02B 37/04* (2013.01); *F02B 37/16* (2013.01);
(Continued)

(58) Field of Classification Search
CPC .. F02D 41/007; F02D 11/105; F02D 41/0097; F02D 41/10; F02D 23/005;
(Continued)

(56) References Cited

U.S. PATENT DOCUMENTS

| 6,938,420 B2 * | 9/2005 | Kawamura | F02D 41/0007 60/608 |
| 7,644,586 B2 * | 1/2010 | Yamagata | F02D 41/0007 60/612 |

(Continued)

FOREIGN PATENT DOCUMENTS

| JP | 57212331 A * 12/1982 | F02B 39/10 |
| JP | 2005-180213 A   7/2005 | |

(Continued)

*Primary Examiner* — Thai Ba Trieu
(74) *Attorney, Agent, or Firm* — Morgan, Lewis & Bockius LLP

(57) ABSTRACT

A method of controlling an engine system equipped with a supercharger may include determining a target value of boost pressure, depending on an rpm of an engine and then determining whether the supercharger is in an operable region, deducing a target rpm of the supercharger, based on a reference value previously input into the controller and a current state value of a vehicle input into the controller, when it has been determined in the operating-region determination that the supercharger is in the operable region, setting a maximum value, in the target rpm deduced in the target-rpm deduction, to a drive rpm of the supercharger, and verifying whether the set drive rpm is greater than or equal to a predetermined reference value previously input into the controller, and driving the supercharger at the set drive rpm, by closing the bypass valve to open the supercharger path.

19 Claims, 2 Drawing Sheets

(51) Int. Cl.
*F02D 41/00* (2006.01)
*F02B 37/16* (2006.01)
*F02B 37/24* (2006.01)
*F02D 11/10* (2006.01)
*F02D 41/10* (2006.01)
*F02B 39/10* (2006.01)
*F02B 37/04* (2006.01)
*F02D 23/00* (2006.01)
*F02B 29/04* (2006.01)

(52) U.S. Cl.
CPC ............ *F02B 37/24* (2013.01); *F02B 39/10* (2013.01); *F02D 11/105* (2013.01); *F02D 41/0097* (2013.01); *F02D 41/10* (2013.01); *F02B 29/0406* (2013.01); *F02D 23/005* (2013.01); *F02D 2200/0406* (2013.01); *F02D 2200/703* (2013.01); *Y02T 10/144* (2013.01)

(58) Field of Classification Search
CPC ....... F02D 2200/0406; F02D 2200/703; F02B 39/10; F02B 37/16; F02B 37/04; Y02T 10/144
USPC ............ 60/601, 605.1, 608–609, 611–612; 123/562
See application file for complete search history.

(56) References Cited

U.S. PATENT DOCUMENTS

| | | | |
|---|---|---|---|
| 7,793,500 B2* | 9/2010 | Igarashi | F02D 41/0007 60/611 |
| 2012/0079823 A1* | 4/2012 | Son | F02B 39/10 60/602 |
| 2016/0061104 A1* | 3/2016 | Hirayama | F02B 39/10 60/602 |
| 2016/0076438 A1* | 3/2016 | Tabata | F02D 41/0007 60/602 |
| 2016/0115859 A1* | 4/2016 | Tanada | F02B 39/10 123/565 |
| 2017/0145905 A1* | 5/2017 | Yamane | F02D 41/0007 |
| 2017/0145906 A1* | 5/2017 | Tomita | F02D 41/0007 |
| 2018/0100456 A1* | 4/2018 | Yokono | F02D 41/0007 |

FOREIGN PATENT DOCUMENTS

| | | | | |
|---|---|---|---|---|
| JP | 2011-052584 A | 3/2011 | | |
| JP | 2011-111929 A | 6/2011 | | |
| JP | 2013-199854 A | 10/2013 | | |
| JP | 2014-169648 A | 9/2014 | | |
| KR | 10-1473710 B1 | 12/2014 | | |
| WO | WO 2017139822 A1 * | 8/2017 | | F02B 39/10 |

* cited by examiner

METHOD OF CONTROLLING ENGINE SYSTEM EQUIPPED WITH SUPERCHARGER

CROSS REFERENCE TO RELATED APPLICATION

The present application claims priority to Korean Patent Application No. 10-2015-0168765, filed Nov. 30, 2015, the entire contents of which is incorporated herein for all purposes by this reference.

BACKGROUND OF THE INVENTION

Field of the Invention

The present invention relates to a method of controlling an engine system equipped with a supercharger, which is intended to control the supercharger depending on a drive mode of an engine, in an engine system equipped with a supercharger and a turbocharger.

Description of Related Art

In order to increase a boost ratio of intake air in the case of a diesel engine, an engine system equipped with a turbocharger or both a supercharger and a turbocharger is applied to the diesel engine. In particular, a motor-operated supercharger that is driven not by a driving force of an engine but by a driving force of a motor may be applied. Generally, since a compressor of the motor-operated supercharger shows an inverse proportional relationship between a flow rate and a compression ratio, the compression ratio is low in a high flow-rate zone and the compression ratio is high in a low flow-rate zone. That is, the supercharger is operated only as a flow resistor in a region out of an operating region.

Further, the turbocharger has a troublesome turbo lag problem and a problem of matching a size of the turbocharger, so that emission (EM) and fuel efficiency may be deteriorated due to an inefficient turbo operation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling an engine system equipped with a supercharger, which is capable of increasing the efficiency of the engine system, by appropriately controlling the supercharger.

According to various aspects of the present invention, a method of controlling an engine system equipped with a supercharger may include operating-region determination, by a controller, of determining a target value of boost pressure, depending on an rpm of an engine and then determining whether the supercharger is in an operable region, target-rpm deduction, by the controller, of deducing a target rpm of the supercharger, based on a reference value previously input into the controller and a current state value of a vehicle input into the controller, when it has been determined in the operating-region determination that the supercharger is in the operable region, drive-rpm setting, by the controller, of setting a maximum value in the target rpm deduced in the target-rpm deduction, to a drive rpm of the supercharger, and verifying whether the set drive rpm is greater than or equal to a predetermined reference value previously input into the controller, and supercharger driving, by the controller, of driving the supercharger at the set drive rpm, by closing the bypass valve to open the supercharger path when the drive rpm set in the drive-rpm setting is greater than or equal to the reference value.

In the operating-region determination, a target value of boost pressure may be determined based on the rpm of the engine and a fuel level.

The operating-region determination may further include boost-pressure comparison, by the controller, of comparing the target value of the boost pressure determined in the controller with a current value of the boost pressure input into the controller.

In the operating-region determination, it may be determined whether the supercharger is in the operable region, based on an air volume introduced into the supercharger and an operable maximum rpm of the supercharger.

When it is determined in the operating-region determination that the supercharger is not in the operable region, the bypass valve is opened to close the supercharger path.

In the target-rpm deduction, the controller may determine that an opening degree of the acceleration pedal is greater than or equal to a predetermined reference value that was previously input into the controller.

In the target-rpm deduction, when the opening degree of the acceleration pedal is greater than or equal to the predetermined reference value that was previously input into the controller, the target rpm of the supercharger is deduced based on the opening degree of the acceleration pedal, the rpm of the engine, a fuel level, and a current pressure of an intake manifold.

In the target-rpm deduction, the controller may verify whether a change rate of the opening degree of the acceleration pedal as a function of a time is greater than or equal to the predetermined reference value that was previously input into the controller.

In the target-rpm deduction, when the change rate of the opening degree of the acceleration pedal as the function of the time is greater than or equal to the predetermined reference value that was previously input into the controller, the target rpm of the supercharger may be deduced based on the change rate in the opening degree of the acceleration pedal as the function of the time, the rpm of the engine, a fuel level, and a current pressure of the intake manifold.

In the target-rpm deduction, the controller may deduce driving power, based on inlet pressure, outlet pressure, and introduced air volume of the supercharger.

The target-rpm deduction may further include boost-ratio deduction, by the controller, of deducing a boost ratio of the supercharger and the turbocharger.

In the boost-ratio deduction, the controller may deduce the boost ratio based on the inlet pressure and the outlet pressure of the supercharger, the target value of the boost pressure, and atmospheric pressure.

In the boost-ratio deduction, the controller may deduce a variance between the inlet pressure and the outlet pressure of the supercharger.

In the boost-ratio deduction, the controller may deduce an opening degree of a turbocharger vane.

In the boost-ratio deduction, the controller may deduce an improved amount of fuel efficiency.

In the boost-ratio deduction, the controller may deduce the boost ratio of the supercharger and the turbocharger by comparing the driving power of the supercharger with the improved amount of the fuel efficiency.

In the target-rpm deduction, the target rpm of the supercharger may be deduced based on the target value of the boost pressure, the boost ratio of the supercharger and the turbocharger, and the introduced air volume.

It may be verified in the target-rpm deduction whether a difference between the target value of the boost pressure and a current value of the boost pressure, deduced in the operating-region determination, is greater than or equal to the predetermined reference value previously input into the controller.

In the target-rpm deduction, when the difference between the target value of the boost pressure and the current value of the boost pressure is greater than or equal to the predetermined reference value previously input into the controller, the target rpm of the supercharger may be deduced, based on a difference value between the target value of the boost pressure and the current value of the boost pressure, the inlet pressure and introduced air volume of the supercharger.

When the drive rpm set at the drive-rpm setting is less than the reference value, the operating-region determination may be repeatedly performed.

The method of controlling the engine system equipped with the supercharger is advantageous in that the bypass valve is provided on the supercharger path through which air flows into the supercharger, and the supercharger path is controlled to be opened or closed as the bypass valve opens or closes, so that torque is improved at low and medium speeds and thereby power performance and acceleration performance may be improved. Furthermore, by determining and controlling the boost ratio of the supercharger and the turbocharger, the fuel efficiency is improved, defects in turbo lag and follow-up characteristics are improved, and thereby improvement in EM is enabled.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
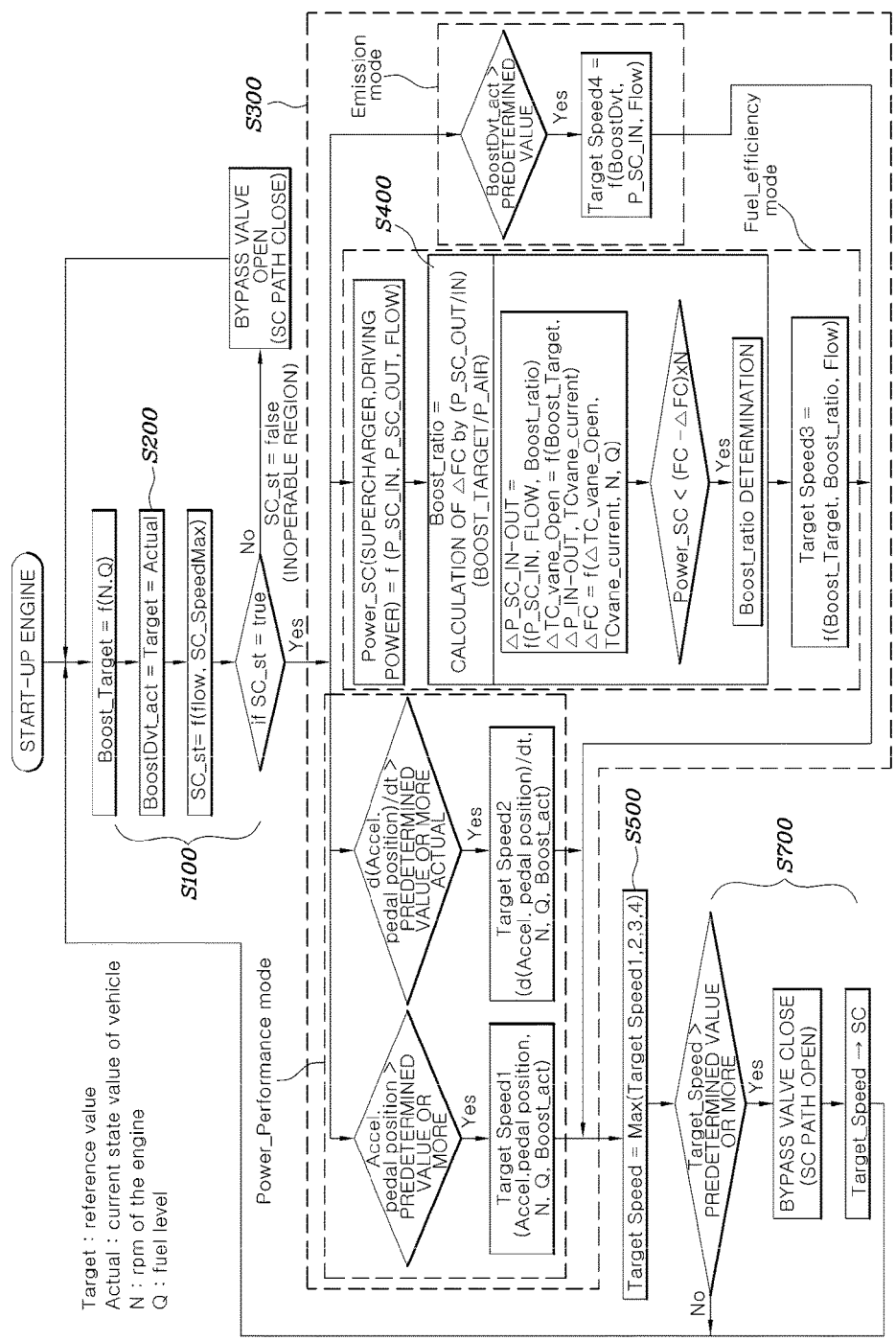
FIG. 1 is a flowchart illustrating an exemplary method of controlling an engine system equipped with a supercharger according to the present invention.
Figure 2:
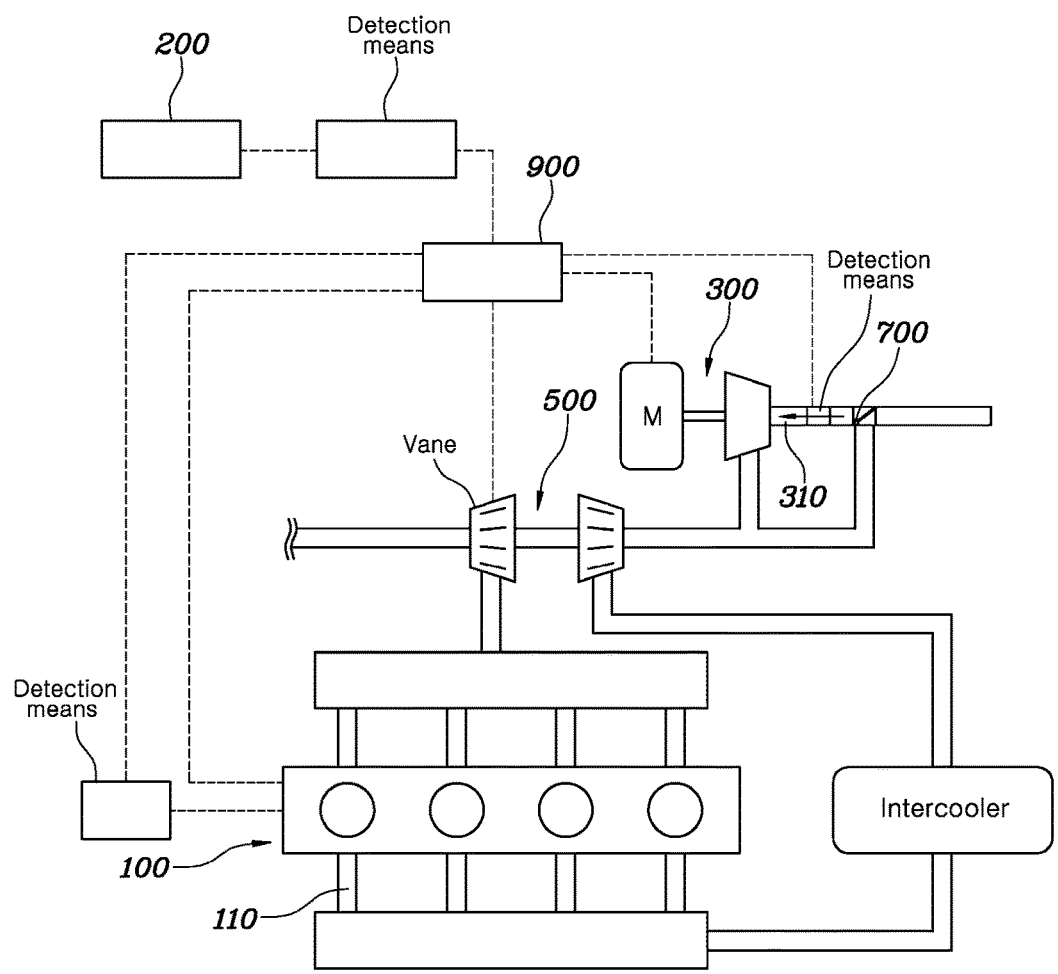
FIG. 2 is a block diagram illustrating a configuration of the engine system for implementing the exemplary method of FIG. 1, according to the present invention.

FIG. 1 is a flowchart illustrating a method of controlling an engine system equipped with a supercharger according to various embodiments of the present invention, and FIG. 2 is a block diagram illustrating the configuration of the engine system for implementing the method of FIG. 1 according to the present invention.

Although various embodiments where a motor-operated supercharger 300 driven by a motor is mounted will be shown and described herein, the driving manner of the supercharger 300 is not limited thereto and may be changed as desired.

According to the present invention, a supercharger 300 is driven after a driving region of an engine 100 is divided into a power-performance mode, a fuel-efficiency mode, and an Emission (EM) mode, and then a target rpm of the supercharger 300 is deduced for each mode. Therefore, the method of controlling the engine system equipped with the supercharger according to various embodiments of the present invention includes an operating-region determination step S100 of calculating a target value of boost pressure in a controller 900 depending on an rpm of an engine and then determining whether the supercharger 300 is in an operable region, a target-rpm deduction step S300 of deducing a target rpm of the supercharger 300 in the controller 900, based on a reference value previously input into the controller 900 and a current state value of a vehicle input into the controller 900, if it has been determined at the operating-region determination step S100 that the supercharger 300 is in the operable region, a drive-rpm setting step S500 of setting a maximum value in the target rpm deduced at the target-rpm deduction step S300 to a drive rpm of the supercharger 300, and verifying whether the set drive rpm is equal to or more than, i.e., greater than or equal to a predetermined reference value previously input into the controller 900, and a supercharger driving step S700 of driving the supercharger 300 at the set drive rpm, by closing the bypass valve 700 to open the supercharger path 310 if the drive rpm set at the drive-rpm setting step S500 is greater than or equal to the reference value.

If the engine 100 of the vehicle starts driving, the operating-region determination step S100 is performed in the controller 900 to calculate a target value of boost pressure based on the rpm of the engine and a fuel level or on the rpm of the engine and a load, which are detected and transmitted by the detection means. The operating-region determination step S100 further includes a boost-pressure comparison step S200 of comparing the target value of the boost pressure calculated in this way with a current value of the boost pressure input into the controller 900. At the boost-pressure comparison step S200, it is preferable to perform the boost-pressure comparison by subtracting the current value of the boost pressure from the target value of the boost pressure. Thereafter, at the operating-region determination step S100, it is determined whether the supercharger 300 is in the operable region, based on an air volume introduced into the supercharger 300 and an operable maximum rpm of the supercharger 300.

If it is determined at the operating-region determination step S100 that the supercharger 300 is not in the operable region, the bypass valve 700 is opened to close the supercharger path 310, and the operating-region determination step S100 is repeatedly performed. Thus, when the supercharger 300 is not in the operable region, the supercharger 300 is not driven.

If it is determined at the operating-region determination step S100 that the supercharger 300 is in the operable region, the target-rpm deduction step S300 is performed in the controller 900 to deduce the target rpm of the supercharger 300 based on the reference value previously input into the controller 900 and the current state value of the vehicle input into the controller 900. At the target-rpm deduction step S300, the drive region of the engine 100 is divided into modes and then the target rpm is deduced depending on an associated drive mode.

In detail, the drive region of the engine 100 is divided into a power-performance mode, a fuel-efficiency mode and an Emission (EM) mode, and the purpose of driving the supercharger 300 varies depending on each mode. First, in the power-performance mode, the purpose is to improve the acceleration performance through improvement in low-speed torque. In the fuel-efficiency mode, the purpose is to operate the supercharger 300 at points where the efficiency of the supercharger 300 and the efficiency of the turbocharger 500 are maximum. Finally, in the EM mode, the purpose is to improve defects in the turbo lag or the control follow-up characteristics and thereby operate the supercharger 300 in a direction of preventing CO, HC and PM from being increased and discharged.

First, a case where the drive mode of the engine 100 is determined as the power-performance mode and the target rpm of the supercharger 300 is deduced will be described. In order to operate the supercharger 300 for the purpose of improving the low-speed torque and the acceleration performance, a driver's intention should be reflected. His or her intention may be sensed depending on an opening degree (engine load) of an acceleration pedal 200 related to a pressed amount of the acceleration pedal 200 that is pressed by the driver, and a change rate of the opening degree as the function of a time. Therefore, the target rpm is deduced in the controller 900 based on the reference value related to the acceleration pedal 200 that is previously input into the controller 900 and a change (current state value) of the acceleration pedal 200 transmitted from the detection means.

That is, at the target-rpm deduction step S300, the controller 900 verifies that the opening degree of the acceleration pedal 200 is greater than or equal to a predetermined reference value that is previously input into the controller 900. If the opening degree of the acceleration pedal 200 is greater than or equal to the predetermined reference value that is previously input into the controller 900, it is determined that the driving of the engine 100 is in the power-performance mode. Thus, the target rpm of the supercharger 300 is deduced in the controller 900 based on the opening degree of the acceleration pedal 200, the rpm of the engine, the fuel level and the current pressure of an intake manifold 110. In this regard, the deduced target rpm is referred to as a first target rpm of the power-performance mode.

In addition, at the target-rpm deduction step S300, the controller 900 verifies that a change rate in the opening degree of the acceleration pedal 200 as the function of the time is greater than or equal to the predetermined reference value that is previously input into the controller 900. If the change rate in the opening degree of the acceleration pedal 200 as the function of the time is greater than or equal to the predetermined reference value that is previously input into the controller 900, it is determined that the driving of the engine 100 is in the power-performance mode, too. Thus, the target rpm of the supercharger 300 is deduced in the controller 900 based on the change rate in the opening degree of the acceleration pedal 200 as the function of the time, the rpm of the engine, the fuel level and the pressure of an intake manifold 110. In this regard, the deduced target rpm is referred to as a second target rpm of the power-performance mode.

Second, a case where the drive mode of the engine 100 is determined as the fuel-efficiency mode and the target rpm of the supercharger 300 is deduced will be described. In order to operate the supercharger 300 for the purpose of causing the engine 100 to enter the fuel-efficiency mode, an overall determination based on the driving power of the supercharger 300, an increase in pressure during the driving of the supercharger 300, and an opening degree of the turbocharger vane corresponding to the increase in pressure is required. By means of an equation input into the controller 900 based on these contents, the target rpm of the supercharger 300 may be deduced.

First, at the target-rpm deduction step S300, the controller 900 deduces the driving power of the supercharger 300, based on inlet pressure, outlet pressure and introduced air volume of the supercharger 300. After the driving power of the supercharger 300 is deduced, a boost-ratio deduction step S400 of deducing the boost ratio of the supercharger 300 and the turbocharger 500 may be further carried out.

At the boost-ratio deduction step S400, the controller 900 deduces the boost ratio based on the inlet pressure and the outlet pressure of the supercharger 300, the target value of the boost pressure and the atmospheric pressure, and may be represented by the following equation 1.

$$\text{Boost ratio of supercharger and turbocharger} = (\text{output pressure of supercharger}/\text{input pressure of supercharger})/(\text{target value of boost pressure}/\text{atmospheric pressure}).$$    Equation 1:

At the boost-ratio deduction step S400, an improved amount of the fuel efficiency for each boost ratio of Equation 1 is calculated.

At this time, in order to deduce the boost ratio at the boost-ratio deduction step S400, the controller 900 deduces a variance between the inlet pressure and the outlet pressure of the supercharger 300 based on the inlet pressure, the introduced air volume, and the boost ratio of the supercharger 300. Further, at the boost-ratio deduction step S400, the controller 900 deduces the opening degree of the turbocharger vane based on the target value of the boost pressure, the variance between the inlet pressure and the outlet pressure of the supercharger 300, and the current position of the turbocharger vane. At the boost-ratio deduction step S400, the controller 900 deduces the improved amount of the fuel efficiency based on the opening degree of the turbocharger vane as the boost ratio is adjusted, the current position of the turbocharger vane, the rpm of the engine, and the fuel level or the load.

The boost ratio is determined based on the driving power of the supercharger 300, the fuel efficiency, the improved amount of the fuel efficiency, and the rpm of the engine, each of which is deduced as described above.

$$\text{Driving power of supercharger} < (\text{fuel efficiency} - \text{improved amount of fuel efficiency}) \times \text{rpm of engine}. \quad \text{Equation 2:}$$

Here, when the improvement of the fuel efficiency is compared with the driving power of the supercharger 300 through Equation 2 and then the driving power is small, the engine 100 is determined as being in the fuel-efficiency mode and the boost ratio of the supercharger 300 and the turbocharger 500 is deduced. Thus, at the target-rpm deduction step S300, the target rpm of the supercharger 300 is deduced based on the target value of the boost pressure, the boost ratio of the supercharger 300 and the turbocharger 500, and the introduced air volume, and the deduced target rpm is referred to as a third target rpm.

Third, a case where the drive mode of the engine 100 is determined as the EM mode and the target rpm of the supercharger 300 is deduced will be described. In the EM mode, improvement in fuel efficiency may not be expected by electrical driving power of the supercharger 300. However, the EM mode is performed to reduce the deterioration of CO, HC, and PM that are generated due to defects in turbo lag or control follow-up characteristics resulting from insufficient charge, and may be sensed by a difference between the target value of the boost pressure and the current value of the boost pressure, and by an increase in boost pressure. Therefore, the controller 900 deduces the target rpm based on the target value of the boost pressure previously input into the controller 900 and the current value of the boost pressure through the operating-region determination step S100 and the boost-pressure comparison step S200.

That is, at the target-rpm deduction step S300, it is verified that the difference between the target value of the boost pressure and the current value of the boost pressure, which is deduced at the operating-region determination step S100, is greater than or equal to the predetermined reference value that is previously input into the controller 900. If the difference between the target value of the boost pressure and the current value of the boost pressure is equal to or more than the predetermined reference value that is previously input into the controller 900, this is determined as the EM mode. Therefore, based on a difference value between the target value of the boost pressure and the current value of the boost pressure, an inlet pressure of the supercharger 300 and an introduced air volume, the target rpm of the supercharger 300 is deduced, and the deduced target rpm is referred to as a fourth target rpm.

At the target-rpm deduction step S300, only one target rpm or up to four target rpm may be deduced depending on the driving state of the engine 100. Therefore, at the target-rpm deduction step S300, a maximum value among the deduced first to fourth target rpm is set as the drive rpm of the supercharger 300. Subsequently, a drive-rpm setting step S500 is performed to verify that the set drive rpm is equal to or more than the predetermined reference value previously input into the controller 900. If the drive rpm set at the drive-rpm setting step S500 is less than the reference value, the operating-region determination step S100 is repeatedly performed.

In contrast, if the drive rpm set at the drive-rpm setting step S500 is equal to or more than the reference value, the supercharger driving step S700 is performed to open the supercharger path 310 by closing the bypass valve 700 and then drive the supercharger 300 at the set drive rpm. Thereafter, the operating-region determination step S100 is repeatedly carried out.

The process of deducing the first target rpm, the second target rpm, the third target rpm and the fourth target rpm may be previously input into the controller 900, based on a map deduced through physical contents and actual experiments. These contents may be changed in various ways depending on a design or environment.

As described above, the present invention provides a method of controlling an engine system equipped with a supercharger, in which a bypass valve is provided on a supercharger path through which air flows into the supercharger, and the supercharger path is controlled to be opened or closed as the bypass valve opens or closes, so that torque is improved at low and middle speeds and thereby power performance and acceleration performance may be improved. Furthermore, by determining and controlling a boost ratio of the supercharger and a turbocharger, fuel efficiency is improved, defects in turbo lag and follow-up characteristics are improved, and thereby improvement in EM is enabled.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an engine system equipped with a supercharger assisted by an electric motor and positioned upstream an exhaust gas turbocharger, comprising steps of:
    in an operating-region determination of a controller, determining a target value of boost pressure, depending on an rpm of an engine in which the rpm of the engine is detected and transmitted by a detection means and then determining whether the supercharger is in an operable region based on an air volume introduced into the supercharger and a rpm of the supercharger;
    in a target-rpm deduction of the controller, deducing at least one or more target rpm of the supercharger, based on comparing a reference value previously input into the controller with at least one of an opening degree of an acceleration pedal, the rpm of the engine, a fuel level, a current pressure of an intake manifold, a change rate of the opening degree of the acceleration pedal as a function of a time, the target value of the boost pressure, a boost ratio of the supercharger and the turbocharger, and the introduced air volume during an operable region of the supercharger;
    in a drive-rpm setting of the controller, setting a maximum value of rpm among the at least one or more target rpm of the supercharger having been deduced to a drive rpm of the supercharger by the controller, and verifying whether the drive rpm of the supercharger is greater than or equal to a reference value previously input into the controller; and in a supercharger driving of the controller, driving the supercharger at the drive rpm, by the controller, to actuate a bypass valve in a close position and simultaneously to open a supercharger path when the drive rpm of the supercharger is greater than or equal to the reference value.

2. The method as set forth in claim 1, wherein, in the operating-region determination of the controller, determining the target value of the boost pressure is based on the rpm of the engine and the fuel level in which the fuel level is detected and transmitted by the detection means.

3. The method as set forth in claim 1, wherein the operating-region determination of the controller, further comprises:
    comparing the target value of the boost pressure determined by a boost-pressure comparison in the controller with a current value of the boost pressure input into the controller, wherein the current value of the boost pressure is detected and transmitted by the detection means.

4. The method as set forth in claim 1, wherein, in the operating-region determination of the controller, determining the operable region of the supercharger is based on the air volume introduced into the supercharger in which the air volume is detected by the detection means and an operable maximum rpm of the supercharger in which the operable maximum rpm of the supercharger was previously input into the controller.

5. The method as set forth in claim 1, including:
    in the operating-region determination of the controller, opening the bypass valve and simultaneously closing the supercharger path, by the controller, when the supercharger is not in the operable region.

6. The method as set forth in claim 1, including:
    in the target-rpm deduction of the controller, determining, by the controller, that the at least one of the opening degree of the acceleration pedal detected and transmitted by the detection means is greater than or equal to a predetermined reference value of the opening degree of the acceleration pedal.

7. The method as set forth in claim 6, wherein, in the target-rpm deduction of the controller, when the at least one of the opening degree of the acceleration pedal is greater than or equal to the predetermined reference value, the step of deducing the target rpm of the supercharger is based on the opening degree of the acceleration pedal, the rpm of the engine, the fuel level, and a current pressure of an intake manifold in which the current pressure of the intake manifold is detected and transmitted by the detection means.

8. The method as set forth in claim 1, including:
    in the target-rpm deduction of the controller, determining when a change rate of the opening degree of the acceleration pedal, by the controller, as the function of the time is greater than or equal to a predetermined reference value.

9. The method as set forth in claim 8, including:
    in the target-rpm deduction of the controller, when the change rate of the opening degree of the acceleration pedal as the function of the time is greater than or equal to the predetermined reference value, deducing the target rpm of the supercharger by the controller based on the change rate in the opening degree of the acceleration pedal as the function of the time, the rpm of the engine, the fuel level, and a current pressure of the intake manifold.

10. The method as set forth in claim 1, including:
    in the target-rpm deduction of the controller, deducing driving power by the controller, based on inlet pressure, outlet pressure, and the introduced air volume of the supercharger.

11. The method as set forth in claim 10, further comprising:
    a boost-ratio deduction of the controller, the boost-ratio deduction of the controller including deducing the boost ratio based on the inlet pressure and the outlet pressure of the supercharger, the target value of the boost pressure, and atmospheric pressure by the controller.

12. The method as set forth in claim 10, further comprising:
    a boost-ratio deduction of the controller, the boost-ratio deduction of the controller including deducing a variance between the inlet pressure and the outlet pressure of the supercharger by the controller.

13. The method as set forth in claim 10, further comprising:
    a boost-ratio deduction of the controller, the boost-ratio deduction of the controller including deducing an opening degree of a turbocharger vane by the controller.

14. The method as set forth in claim 13, including:
    in the boost-ratio deduction of the controller, deducing an improved amount of fuel efficiency, based on the opening degree of the turbocharger vane as the boost ratio is adjusted, a current position of the turbocharger vane, the rpm of the engine, and the fuel level or a load, by the controller.

15. The method as set forth in claim 14, including:
    in the boost-ratio deduction of the controller, deducing the boost ratio of the supercharger and the turbocharger by comparing a driving power of the supercharger with the improved amount of the fuel efficiency by the controller.

16. The method as set forth in claim 1, including:
    in the target-rpm deduction of the controller, deducing the target rpm of the supercharger based on the target value of the boost pressure, the boost ratio of the supercharger and the turbocharger, and the introduced air volume by the controller.

17. The method as set forth in claim 1, including:
    deducing a current value of the boost pressure in the operating-region determination; and
    verifying in the target-rpm deduction of the controller whether a difference value between the target value of the boost pressure and the current value of the boost pressure which the current value of the boost pressure is detected and transmitted by the detection means is greater than or equal to the predetermined reference value.

18. The method as set forth in claim 17, including:
    in the target-rpm deduction of the controller, when the difference between the target value of the boost pressure and the current value of the boost pressure, in which the current value of the boost pressure is detected and transmitted by the detection means is greater than or equal to the predetermined reference value previously input into the controller, deducing the target rpm of the supercharger by the controller, based on the difference value between the target value of the boost pressure and the current value of the boost pressure, the inlet pressure and the introduced air volume of the supercharger.

19. The method as set forth in claim 1, repeating the operating-region determination by the controller when the drive rpm set in the drive-rpm setting of the controller is less than the reference value.

\* \* \* \* \*